United States Patent
Johnstone et al.

(12) 
(10) Patent No.: US 6,257,875 B1
(45) Date of Patent: Jul. 10, 2001

(54) TORCHES AND BURNERS FOR FLAME CULTIVATION AND FLAMING

(75) Inventors: Ian Johnstone, Fyshwick; Robert Smith, Penrith, both of (AU)

(73) Assignee: Origin Energy LPG Limited, Sydney (AU)

( * ) Notice: Subject to any disclaimer, the term of this patent is extended or adjusted under 35 U.S.C. 154(b) by 0 days.

(21) Appl. No.: 09/445,828

(22) PCT Filed: Mar. 16, 1999

(86) PCT No.: PCT/AU99/00164

§ 371 Date: Apr. 4, 2000

§ 102(e) Date: Apr. 4, 2000

(87) PCT Pub. No.: WO99/52355

PCT Pub. Date: Oct. 21, 1999

(51) Int. Cl.[7] ........................ F24H 1/18
(52) U.S. Cl. ............... 431/345; 431/343; 431/242; 431/248; 126/271.2 R
(58) Field of Search .............. 126/271.2 R, 271.1, 126/271.2 C, 271.2 A, 271.2 B; 431/344, 345, 343, 350, 207, 232, 233, 242, 274, 248

(56) References Cited

U.S. PATENT DOCUMENTS

| | | | |
|---|---|---|---|
| 1,058,900 | * 4/1913 | Ploch | 126/271.2 R |
| 1,231,969 | * 7/1917 | Taylor | 126/271.2 R |
| 2,408,328 | 9/1946 | McLemore . | |
| 2,497,939 | 2/1950 | Garraway . | |
| 2,548,196 | 4/1951 | Clark . | |
| 2,833,272 | * 5/1958 | Kennepohl | 126/271.2 R |
| 3,177,922 | 4/1965 | Pardee . | |
| 3,357,474 | 12/1967 | Pivonka . | |
| 3,486,497 | 12/1969 | Pivonka . | |
| 3,645,664 | 2/1972 | Rodney . | |
| 5,030,086 | * 7/1991 | Jones | 126/271.2 C |

FOREIGN PATENT DOCUMENTS

| | | |
|---|---|---|
| 1 269 525 | 12/1961 | (FR) . |
| WO 98/01031 | 1/1998 | (WO) . |

* cited by examiner

*Primary Examiner*—James C. Yeung
(74) *Attorney, Agent, or Firm*—Finnegan Henderson Farabow Garrett & Dunner, L.L.P.

(57) ABSTRACT

The invention relates to an LPG combusting burner device for flaming and flame cultivation purposes and an improved hand-held torch that may incorporate such burner device. The burner device includes a primary burner (14) having at least one fuel delivery nozzle or jet (80) arranged within an open combustion chamber (71) defined within a burner skirt (70) such as to direct a stream of fuel towards a flame delivery opening of the skirt (70), and a vaporiser (18) located in heat exchanging proximity to the primary burner (14) and having a pressurization chamber with an inlet for liquid LPG fuel and an outlet for gaseous LPG fuel, the inlet being arranged to be in fluid communication with a source of pressurized LPG and the other being in communication with the nozzle of the primary burner. A metering duct (37) is located in close vicinity or within the vaporiser (18) and arranged to discretely limit the amount of liquid fuel entering the vaporisation chamber via its inlet, and a first pressure reduction duct (52) is provided in the flow path of gaseous fuel between the vaporisation chamber outlet and the nozzle of the primary burner (14) the first pressure reduction duct (52) arranged to impart a discrete pressure drop to gaseous fuel flowing therethrough between the vaporisation chamber (50) and the nozzle of the primary burner (14), the discrete pressure drop being such as to generate a low velocity combustion flame in the primary burner (14) during normal burner operation.

33 Claims, 3 Drawing Sheets

TORCHES AND BURNERS FOR FLAME CULTIVATION AND FLAMING

FIELD OF THE INVENTION

The present invention is concerned with flame cultivation burners and flaming torches which find application in agricultural and forrestal land management, road surface asphalting and similar tasks which require application of heat or a flame onto objects. In particular, the present invention is concerned with flame cultivation burners and flaming torches which use liquefied petroleum gas (LPG) as a fuel source for the bumers, and relates to an improved burner with integral fuel vaporiser and improved hand-held flame cultivation and flaming torches.

BACKGROUND OF THE INVENTION AND PRIOR ART

Flame treatment or "flame cultivation" is well known in agriculture and horticulture to control weeds and pests that adversely affect arable land. There is a large body of published patent literature concerned with many aspects of this technology, U.S. Pat. No. 2,408,328 setting forth the basic principles of flame cultivation, and thus, reference should be made to this U.S. patent for a detailed explanation of the technique.

Flame cultivation and flaming burners can be incorporated in hand-held torch devices carried by a person for localised or small scale flame cultivation to control weeds and plant pests, particularly in hard to access locations, such as drainage trenches, irrigation ditches and the like, as well as for igniting vegetation for small and large scale clearance of arable land, back-burning operations and the like. Such burners also find use in motorised flame cultivators incorporating a bank or array of burners supported on a boom carried or drawn by a self-propelled agricultural vehicle for large scale surface flame cultivation of arable land.

In the following, the expression torch head and burner will be used synonymously to denote a hollow prismatic or tubular skirt or casing that houses at least one gas delivery jet arrange to emit a jet of combustible fuel (either liquid or gaseous) that is combusted at least partially within the casing so as to generate a flame that is discharged under draft or pressure from an appropriately shaped burner casing mouth. The specific configuration and constructional elements of a flame cultivation and flaming torch heads can vary greatly and is influenced by factors such as the type of application the device is mainly intended for, eg hand-held torches vs torch batteries in an agricultural implement, whether direct flaming or hot combustion gas weeding is to be employed, the fuel supply source, the need for fuel supply regulators and control devices, whether continuous or intermittent high intensity heat is to be applied, the need for a pilot flame or igniters, the required heat energy output rate, burner type (ie combustion of priorly vaporised or vaporising liquid fuel), etc. Accordingly, the large number of patent specifications in this field of technology (international patent classes IPC A01 M 15, F23 D 11, F23 D 14) concern improvements/inventions that are specific to each burner type as well as their specific application.

Agricultural Flame Cultivators

In the field of flame cultivation of large tracts of land, U.S. Pat. No. 3,164,927 (Holloway) discloses a flame cultivator in which a plurality of main burners are supported on a traverse rig or boom mounted on the rear end of a tractor. Two auxiliary burners arranged to direct a gas jet obliquely with respect to the main burner streams (but not intersecting therewith) are mounted on opposite sides outside the prismatic casing of the main burner. All gas delivery jets are supplied with gaseous fuel (butane or propane) from a central supply tank mounted on the tractor via a central supply line and branch lines having regulator valves disposed therein. The gaseous fuel is usually delivered in equal amounts and with equal pressure to the identical fuel delivery jet nozzles, and a mixture of gas and air is created in the burners that is ignited for flame cultivation purposes. It is readily understandable that gas delivery pressure for each jet nozzle can be individually controlled by the associated control valve in the gas delivery lines to each burner to suit varying operational requirements in relation to energy output and flame temperature at each burner. It is also readily apparent that where the burner configuration is modified to use gaseous fuels, an additional vaporiser will be required, as the fuel is conveniently stored in liquid form in a tank, in order to vaporise or convert the liquid fuel into its vapour or gaseous form prior to delivery to the burners. A similar implement is disclosed in U.S. Pat. No. 3,543,436 (Baxter) and U.S. Pat. No. 3,425,407 (Furman et al).

Hand-operated Flame Cultivation and Flaming Torches

Hand-operated torches represent another area of application and are mostly used to destroy plants, e.g. bush, forest undergrowth and the like, in land clearing operations. Such type of torches, referred to as flaming torches, will generally be constructed to generate high intensity flames capable of setting aflame dead wood and live plants alike, whereas with hand-held flame cultivation torches the aim is to destroy unwanted weeds and vermin without setting the crop plants on fire, and thus torch designs are preferred which generate sufficient heat to destroy the cells of young weeds and crop pests without use of high intensity flames that will ignite the vegetation. This aspect is of particular importance in arid zones.

Hand-held torches for agricultural as well as other purposes, e.g. road works, roof taring and the like, generally share a number of common structural features. They have an elongate handle tube or rod which carries at one of its distal ends the torch head which incorporates one (or more) burners. In simple designs, the fuel supply line is connected directly to an LPG hose that is secured at a regulator at the outlet valve of an LPG storage cylinder. More elaborate torches incorporate at the torch itself a deadman shutter (valve) to turn on or off fuel supply to the burners, as well as other regulators and pressure gages in the fuel supply line.

The size of the LPG cylinder of non hand-held torches would usually be determined by the required heat output capacity of the torch burners (as represented by fuel consumption). With hand-held torches though, manoeuvrability of the torch in the field is paramount. For example, small hand-held torches such as those manufactured by Primus and sold under the label "Gardener" and which are mainly intended for the hobby gardener, use small capacity, disposable or refillable LPG cartridges having a self closing connecting valve. Such cartridges can have a capacity of 1 to 3 litres and are attached directly to a fitting at the end of the torch handle. The main limitation as to possible cylinder sizes, however, will generally be their weight. The cylinder must be able to be carried by the torch operator. This is usually accomplished either using a customised back pack or a non-motorised cart. Having regard to restrictions imposed by the location where the torch is to be used and the surrounding terrain, the back pack arrangement is often used in flame cultivation and vegetation torching applications where a larger LPG fuel supply is required, e.g. 5 to 15 litres cylinder capacity.

Smaller hand-held torches incorporate a torch burner arrangement that is relatively lightweight. However, heavy duty, high capacity torch burner heads can have a substantial weight, eg 2 to 4 Kg. Whilst this may not seem much, when mounted at the distal end of a long tubular torch handle of 1.5 m or longer, proper balancing of the torch head by an operator is often difficult and tiring.

Torches with Integral Vaporisers

U.S. Pat. Nos. 3,357,474 and 3,486,497 (both granted to Pivonka) describe torches with combined LPG fuel vaporiser and burner arrangements within a burner casing or head that can equally be integrated in hand-held torches for flame cultivation and igniting vegetation (flaming), as well as large scale flame cultivation implements and machinery.

U.S. Pat. No. 3,357,474 in particular discloses a combined burner-vaporiser torch that uses liquid LPG as fuel source for the burner. LPG is a readily vaporisable liquid fuel (consisting of liquid propane, butane or mixtures thereof, with the possible addition of other hydrocarbons with higher ebullition temperatures). Pivonka specifically discloses the need for a fuel flow control valve in the liquid fuel line running between the liquid fuel storage tank and the vaporiser, the valve being positionable in close vicinity at the rear end of the burner/vaporiser torch; only the forward end portion of the vaporiser and the forward end of the burner shield through which the flames exit the burner will be at a high temperature during torch operation. Due to its constructional arrangement, the rear end of the burner/vaporiser torch remains at temperatures only slightly above ambient temperatures.

When the flow control valve is fully open, LPG is delivered to the vaporiser at a pressure which is essentially dictated by the tank pressure of the LPG storage cylinder. The flow rate of liquid LPG into the vaporiser can be regulated at the flow control valve. In any event, once the liquid LPG exiting the burner nozzles is ignited, because the tubular housing of the vaporiser is in proximity of the flame, the vaporiser chamber will heat up and vaporisation of liquid LPG in the vaporising chamber will take place, thereby lowering the density of the LPG and generating high velocity gas streams therein and consequently also in the burner nozzle chambers. This results in high pressure expelling of fully vaporised fuel through the jet orifices of the burner nozzles once the temperature level within the vaporiser is sufficient to ensure full vaporisation of liquid LPG within the vaporiser chamber, and spitting or flutter in the burner flame is avoided. Pivonka specifically states that the vaporiser-burner device is aimed at providing a high velocity burner flame. Regulation of the flame, and consequently heat energy output by the burners, is carried out solely in the liquid fuel line leading to the vaporiser by way of the conventional flow regulator valve. Such type of arrangement and regulation has inherent weaknesses.

Firstly, and this is a well known phenomenon, regulating flow of a pressurised liquid fuel, which at ambient temperature is gaseous, by means of a flow regulator valve (for example, needle valve) will lead to partial vaporisation of the liquid either in the valve housing itself or downstream of the valve, with the associated take-up of heat by the vaporising resulting in cooling and possible freezing of the fuel lines and fitting. If the flow velocity drop is substantial, the valve itself will tend to frost-up, the ebullition (boiling) temperature of propane fuel being around −42° C. Consequently, liquid fuel supply will be irregular, the vaporiser receiving in some instances liquid and in some instances partially or fully vaporised LPG, depending upon the ambient temperature and pressure induced temperature drop in the fuel supply line between regulator valve and vaporiser. It will be further noted that the torch of Pivonka specifically ensures that the flow regulator in the supply line to the burner-vaporiser torch is not heated by the torch.

A further drawback is the regulating process during steady state burner operation. Regulating the flow of liquid LPG into the vaporiser will only regulate LPG gas burning rate but have little effect on flame velocity over most of the regulator settings. Flame velocity (and burner nozzle gas pressure) regulation would require very fine graduation in a small portion of the wide regulation bandwidth of conventional regulators. In any event, due to the configuration of the vaporiser and the gaseous fuel delivery path to the burner nozzles, notwithstanding liquid LPG flow regulation by means of the control valve, the burner will operate in steady state with high pressure discharge of gaseous fuel and herewith associated high velocity flames which have a long spreading shape. Such high velocity, long spreading flames might be appropriate for some flame cultivation purposes, eg. to penetrate dense or thick plant growth, but is certainly not always necessary nor wanted for flame cultivation or back-burning.

U.S. Pat. No. 3,177,922 (Pardee) discloses a further flame cultivation burner with integrated vaporiser, wherein a flat, box-like burner shield or skirt supports a jet nozzle at a rear closed wall thereof. The nozzle is mounted such as to direct a vaporised jet of gaseous LPG into the inside of the skirt towards the open mouth thereof. The skirt is shaped convergent-divergent to provide a venturi effect in the flow path of the gaseous fuel-air mixture created within the rear section of the shield, combustion air being provided through an air duct opening into the rear section of the shield. The vaporiser itself consists of a separate housing affixed to the top wall of the skirt, the top wall being common to both structures. Liquid LPG is delivered into the vaporising chamber formed within the separate housing by means of a tube which at its open end has a deflector baffle to enhance fluid distribution into the vaporising chamber. A vaporised fuel outlet tube extends from within the vaporising chamber through a wall thereof and is in fluid communication through appropriate rigid lines and fittings with the jet nozzle. All tubing lines extending between the vaporising chamber and the jet nozzle are formed such as to ensure that high pressure gaseous LPG generated within the vaporising chamber (which is effected by heating the additional housing once a flame has been ignited within the burner skirt during normal burner operation) passes unrestricted into the jet nozzle from where it is expelled at high speed and pressure through appropriately sized orifice elements.

The burner/vaporiser torch of Pardee is essentially limited to work at operating pressures (gas pressure at the jet nozzle outlet) dictated by the storage pressure of the liquid LPG in its storage tank, as there is no means of adjusting the operating pressure and hence flame velocity subsequent to vaporisation of the fuel, as pressure drops within the vaporiser and burners are comparatively small. Similar problems exist with the burner device with integrated fuel vaporiser disclosed in U.S. Pat. No. 5,030,086 (Jones)

WO98/01031 (Boral Gas) discloses a vaporiser for use with a flame cultivation device, in which a metering tube is arranged in a hot zone of the vaporiser. The metering tube is arranged for limiting the volume of liquid LPG flow from the LPG storage tank into the vaporisation chamber of the vaporiser. Such vaporiser arrangement disposes with the necessity of fluid LPG flow control by means of a regulator with movable parts and sealing elements that could be subjected to heat corrosion when arranged too close to the hot zone of the vaporiser. Instead, the metering tube ensures a constant supply of liquid LPG into the vaporiser, without the above mentioned icing problems. The fully vaporised gaseous LPG fuel exiting the vaporiser chamber is then regulated in gaseous form using conventional regulator valves for controlling distribution of gaseous fuels to individual burners of a multi-burner implement.

Whilst the basic principle of delivering liquid LPG under supply tank pressure directly into the hot zone within the vaporiser using a fixed metering member with no moving parts and subsequently using conventional regulator valves to control delivery pressure (and amount) of gaseous LPG fuel to the burners of the torch would seem a viable approach in addressing the above mentioned problems associated with the torches of Pivonka and Pardee (ie. trying to regulate the operating pressure of the burners by way of regulating liquid LPG fuel flow into the vaporiser using conventional valves), constructional implementation of such principle would result in vaporiser-burner devices that are expensive because of the need to incorporate gas pressure control valves in the fuel supply lines between vaporiser and burner nozzles, heavy for hand-held implementations and lack the necessary compactness typically required for hand-held torches. Also, typically, gas temperatures of vaporised LPG fuel generated using vaporiser constructions like those of Pivonka, Pardee and Boral Gas, will be in the range of 80°–120° C., this requiring use of regulator valve seals made of heat resistant materials.

Taking into consideration at least some of the problems and drawbacks associated with the above mentioned prior art burner devices with integral fuel vaporisers, the present invention seeks to provide, in at least one preferred embodiment thereof, a burner with integral fuel vaporiser which is able to deliver a low velocity, ground hogging flame for use in flame cultivation that is easy to operate in a safe manner. The burner is to be equally useable in hand-held torches as well as apparatus for flame cultivating rows of crops.

It would also be advantageous for at least a preferred embodiment of the invention to provide a burner device with integral fuel vaporiser that can deliver a high velocity or "booster" flame for use in applications requiring increased heat energy output, in particular as required for flaming.

It would also be advantageous for at least a preferred embodiment of the invention to address balancing problems in particular encountered with hand-held flaming torches that have long torch handles, in a manner which will not or only minimally affect the manoeuvrability of the flaming torch in operation, and provide a hand-held flaming torch that can be safely carried by an operator together with a fuel supply cylinder or canister.

SUMMARY OF THE INVENTION

In a first aspect of the present invention there is provided a burner device (and similarly a torch head) for use in flaming and flame cultivation which includes a primary burner having at least one fuel delivery jet nozzle arranged in an open combustion chamber defined within a burner skirt such as to direct a stream of fuel towards a flame delivery opening (or mouth) of the skirt, and a vaporiser located in heat exchanging proximity to the primary burner and having a pressurisation chamber with an inlet for liquid fuel, in particular LPG, and an outlet for vaporised gaseous fuel, the inlet being connectable to a source of pressurised liquid fuel and the outlet being in fluid communication with the nozzle of the primary burner. Characteristic of the invention is the provision of a metering duct located in close vicinity or within the vaporiser and arranged to discretely restrict (as compared to restrict in variable or adjustable manner) the mount of liquid fuel entering the vaporisation chamber via its inlet, preferably without a substantial pressure drop (as compared to a conventional flow regulator that permits adjustable flow regulation), and the provision of a first pressure reduction duct in the flow path of gaseous fuel between the vaporisation chamber outlet and the nozzle of the primary burner, the first pressure reduction duct arranged to provide a discrete pressure drop of predetermined value for vaporised fuel passing from the vaporisation chamber (during normal operation of the torch) to the gaseous fuel delivery nozzle of the first burner (more precisely a drop in pressure of the gaseous fuel passing through the duct), such as to generate a low velocity flame during normal torch operation.

As used herein, a low velocity burner flame is defined as a combustion flame of gaseous LPG delivered through the jet orifice of the burner nozzle at between 20 to max 30 PSI gas pressure, whereas a medium to high velocity combustion flame is generated by gaseous LPG exiting the nozzle orifice at about 35 to 60 PSI or more gas pressure.

Preferably, the above described burner device can incorporate a booster burner arranged to deliver a medium to high velocity combustion flame through at least one booster nozzle or jet which is in fluid communication with the vaporisation chamber through a second pressure reduction duct arranged to reduce the pressure of the gaseous fuel exiting the vaporisation chamber by an amount required to generate such medium to high velocity flame.

Whilst the nozzles of the primary and booster burners can be arranged within the same burner skirt, it is preferred to arrange the respective nozzles within separate burner skirts that are arranged such that flames emitting therefrom intersect at a small angle and the wide spreading, low velocity flame is superimposed with the narrower, high velocity flame.

Advantageously, a manually operatable shutter valve is provided to selectively permit and cut-off gaseous fuel flow to the booster burner.

The inventive burner device is intended to be connected directly to the outlet valve of a LPG storage tank (either a small cylinder that can be carried by a person in a ruck-sack or on a small cart; or a larger storage cylinder mounted on an agricultural vehicle such as a tractor, where a battery of torches is to be employed similar to the appliance described in Pardee, supra). Generally, the liquid LPG fuel delivery pressure of such tanks is around 90 to 130 PSI gas pressure, depending on ambient conditions. During steady state operation of the burner, where the metered liquid LPG entering the vaporiser is fully vaporised in the vaporisation chamber, the pressure within the vaporisation chamber will then be only slightly smaller than the delivery pressure. The pressure drops attributable to the liquid LPG supply conduits and flashing point entry of liquid LPG into the pressurisation chamber will be comparatively small (eg 5 to 10 PSI gas pressure), and it is believed that pressure losses otherwise attributable to the metering duct are offset by the about 280-fold volume increase which the liquid LPG will undergo in attaining its fully vaporised, gaseous state in the confined pressurisation chamber, thereby generating a pressure increase. The only significant pressure drop of fully vaporised gaseous fuel will take place whilst flowing in the pressure reduction ducts (ducts with small bore and substantial extension, see below) towards the jet nozzle(s).

In other words, by appropriately sizing the metering duct, the pressure reduction ducts and nozzle gas delivery orifices, it is possible to manufacture a simple, self-regulating burner or torch head device, where pressure increase within the vaporisation chamber (as a result of vaporising increasing amounts of liquid LPG entering the chamber via the metering duct against insufficient initial back pressure) will eventually generate sufficient back pressure within the chamber thereby to regulate the amount of liquid fuel entering the chamber and maintain liquid LPG intake into the vaporisation chamber about constant (assuming steady state supply of enough energy to fully vaporise the properly metered LPG quantity within the chamber).

A torch head construction which incorporates the features of claim 5 dispenses with the need for any conventional liquid fuel regulators having moving parts to adjust flow of the liquid LPG fuel in the supply line to the vaporiser, as well as conventional gas valves to adjust pressure of gaseous LPG fuel in the flow path between vaporiser outlet and burner nozzles. Instead, fluid flow is "controlled" to one setting (as provided by the metering member), and gas pressure at the burner nozzle(s) is equally set to a non-adjustable level as a function of the pressure and temperature level present in the vaporisation chamber and the dimensions of the pressure reduction duct.

The vast majority of torch applications require little or no regulation of the flame velocity once the torch has reached steady state operation. Accordingly, manual adjustment of LPG flow into the vaporiser is superfluous (and non-efficient, see above). For example, hand-held LPG burning torches are generally used with conventional LPG storage cylinders which provide the fuel and the operating pressure. The outlet or fuel delivery pressure at an LPG cylinder will remain about constant (assuming constant outside temperature and relatively small fuel flow rates compared with cylinder capacity) for as long as there remains a certain level of liquid LPG in the cylinder; after full vaporisation of liquid LPG in the cylinder, pressure drop will take place over a very short period of time, and torch operation will no longer be possible. Accordingly, it is possible to use a metering member that does not provide for any manual adjustment, as long as such metering member ensures an appropriate fuel supply to the vaporiser and consequently to the burner to achieve a desired burner operating regime. The additional pressure reduction member, which provides a discrete pressure drop between vaporiser chamber and burner nozzles is necessary to obtain the required low velocity torch flame.

The metering duct and the pressure reduction duct can be sized such that the volume of liquid LPG entering the vaporiser is restricted to a specified amount that is vaporisable by a given amount of heat transferred thereto by the heater which preferably is the torch burner itself, and obtain a desired burner jet nozzle operating pressure that will generate the low velocity/spreading flame. Arranging the metering duct in a zone of the vaporiser that is heated during torch operation counters the cooling effect which flow reduction of liquid LPG in the fuel delivery member may cause, thereby ensuring controlled and precise supply of fuel to the vaporiser.

By incorporating the features identified in claim 6, it is possible to adapt the fuel delivery member in discrete steps to different types of LPG fuels for use with the torch, by using exchangeable parts, without the need to exchange the entire fuel delivery member. For example, to achieve the same flow rate for different types of LPG, eg pure propane, pure butane, gas mixtures, the metering duct will have to have different lengths, and/or bore diameters assuming the same fluid delivery pressure at the duct inlet. The length diameter variations may be small, though perceivable as far as torch operating conditions are concerned. Further, the fuel outlet orifice of the fuel delivery member can be incorporated into the exchangeable part, thereby simplifying cleaning operations should the orifice become clogged.

The exchangeable nature of the first pressure reduction tube in accordance with the features identified in claim 8 enables to incorporate a selected one tube of a plurality such tubes in the torch, each tube having different lengths and bore diameters to cause a numerically different pressure drop between inlet and outlet thereof, and thus provide gaseous fuel to the primary burner jet nozzle(s) at a defined (but selected) pressure.

Whilst it is alternatively also possible to incorporate the first pressure reduction duct in the main body of the fuel delivery member, thereby providing an integral arrangement of metering duct and pressure reduction duct within the same part, the number of possible permutations of liquid fuel flow rate to gaseous fuel pressure reduction to achieve a desired torch operating regime, make this more problematic, mainly ease of manufacturing considerations make a multi-part construction of the fuel delivery member of the torch desirable.

A particularly simple torch head design is obtainable in that the fuel delivery member is a unitary metallic fitting having an externally threaded front hub portion onto which is sealingly fastened the otherwise closed tubular vaporiser housing. The closed forward end of the vaporiser housing may be T-shaped to reduce overall length of the housing whist providing sufficient volume for the vaporisation chamber formed therein.

Different advantageous features pertaining to the unitary fitting are identified in claims 11 to 14.

Preferred features and shaping of components of the primary burner are identified in claims 15 to 18.

In accordance with a second aspect of the present invention, the torch head described above can incorporate additionally the features recited in claim 19 thereby to provide increased heat output.

A regulator valve (preferably a shutter valve with on-off regulation only) is advantageously disposed between the gaseous fuel outlet of the second pressure reduction duct and the booster burner jet nozzle(s) so that the torch can be operated with only the primary burner, which provides the ground-hogging, wide spreading flame pattern, as well as with the additional booster burner which, with its medium to high velocity, narrower or more confined flame, will provide additional heat energy when required.

Preferably, the booster burner nozzle(s) is arranged in a separate burner skirt to that in which the primary burner nozzle(s) are housed, the arrangement being such that the planes in which the fuel streams are delivered by the respective jet orifices of the nozzles intersect at an oblique or acute angle. Such arrangement will cause the medium to high velocity flame to "impinge" on the low velocity flame and "drag" this flame with it, thereby creating a flame pattern that is wider than a pure high velocity flame and more energetic than the wide spreading flame of the primary burner alone.

The specific ways in which the second pressure reduction duct can be embodied are similar to those of the first pressure reduction duct, the main difference residing in the necessity of incorporating the shutter valve in the fuel flow path to the booster nozzle.

The heating energy required for vaporisation of fuel in the vaporiser is advantageously supplied by one of the burners once the torch has been ignited, similar to the torch of Pivonka discussed above. However, with the present invention, an arrangement is chosen such that flames exiting the mouth of at least one of the burner skirts will radiate heat energy only to the tip of the vaporiser housing so as to avoid overheating of the vaporisation chamber and its contents.

In a different, third aspect of the present invention there is provided a hand-held flaming and/or flame cultivation torch which includes:

an elongate handle, a torch head at one end of the handle and a fuel tank mounting structure at an opposite end of the torch handle wherein the fuel tank mounting structure includes a handle mount fixed at the handle and a tank support structure pivoted at the handle mount, whereby in use of the torch the weight of the torch head is at least partly counterbalanced with the weight of a fuel storage tank secured at the tank support structure and the tank is pivotable with respect to the handle such as to remain in a substantially vertical or upright position during operation of the torch.

The fuel tank mounting structure with its capability of permitting pivotal movement of the fuel tank, eg an LPG cylinder, with respect to the handle allows the LPG cylinder to remain in a substantially vertical or upright position during operation of the torch which involves directional movement and pointing of the torch handle towards a treatment area by an operator. This pivotal mounting of the tank at the handle is desirable from a safety point of view in that the outlet valve of the cylinder, which is located at the top of the cylinder, should remain in fluid communication with the vapour phase of the LPG within the cylinder rather than the liquid, to ensure proper operation of the torch. This is achieved by keeping the LPG cylinder in its upright orientation during operation of the torch. Also, the pivoting mechanism enables to set down the torch with the cylinder in its upright position on uneven ground.

In further development of the third aspect of the invention, the hand-held torch may the features mentioned in claim 25.

Preferably, the fuel storage tank mounting structure includes the features mentioned in claim 26. This enables fast and simple exchange of the cylinder when required.

There are different ways in which to provide a mounting structure that permits cardanic (rotational freedom of movement about 3 mutually perpendicular axis), gimbal (rotational freedom of movement about two axis) or simple, uniaxial pivotal movement of the LPG tank in relation to the torch handle. In one preferred form, a simple gimbal mount is provided in that an upper skirt of the cradle is pivotally secured and held between a pair of angled support arms which are welded onto a socket hub in which the proximal terminal end of the torch handle is received fixed against axial movement and, if required, also releasably against rotation.

During the course of operation of the flaming torch, the centre of balance at the handle (the location where the strap harness is preferably secured at the handle) will change as the fuel in the cylinder is consumed. To accommodate this, it is advantageous to provide at the handle a fixing device having the features referred to in claim 29, optional embodiments of the fixing device being covered in claims 30 and 31, some other form of variable adjustment mechanism known in the art equally being employable.

To minimise the amount of effort that is required by the operator to point the torch head in the direction required whilst being shouldered, the second handle grip, which preferably is a loop handle orientated at right angles to the torch handle, is advantageously mounted forward of the harness strap fixing point (that is towards the torch head) but close thereto, and the first handle grip, which is a simple tubular grip member, is located immediately rear of the balance point represented by said fixing point.

To improve the safety of the torch operator, a quick release device, such as a clasp buckle, can be incorporated either in the shoulder harness strap or the harness fixing bracket at the torch handle thereby allowing the operator to free him or herself from the torch unit in case of an emergency. This improvement addresses concerns that have been expressed in relation to known, back-pack shouldered fuel supply tanks.

The hand-held torch assembly is especially suited for use with larger torch heads that provide high energy output. Because of their higher weight, the counterbalancing effect of the LPG cylinder will be more appreciated by the torch operator.

Accordingly, the torch head can incorporate a primary burner structure with integrated fuel vaporiser as referred to above in the first aspect of the invention as well as a booster burner as identified under the second aspect of the invention.

The present invention, in its different aspects, and advantages thereof will be more fully appreciated by referring to the following description of preferred, non-limiting embodiments of the invention illustrated in the accompanying drawings.

DETAILED DESCRIPTION OF EMBODIMENTS OF THE INVENTION

Figure 1:
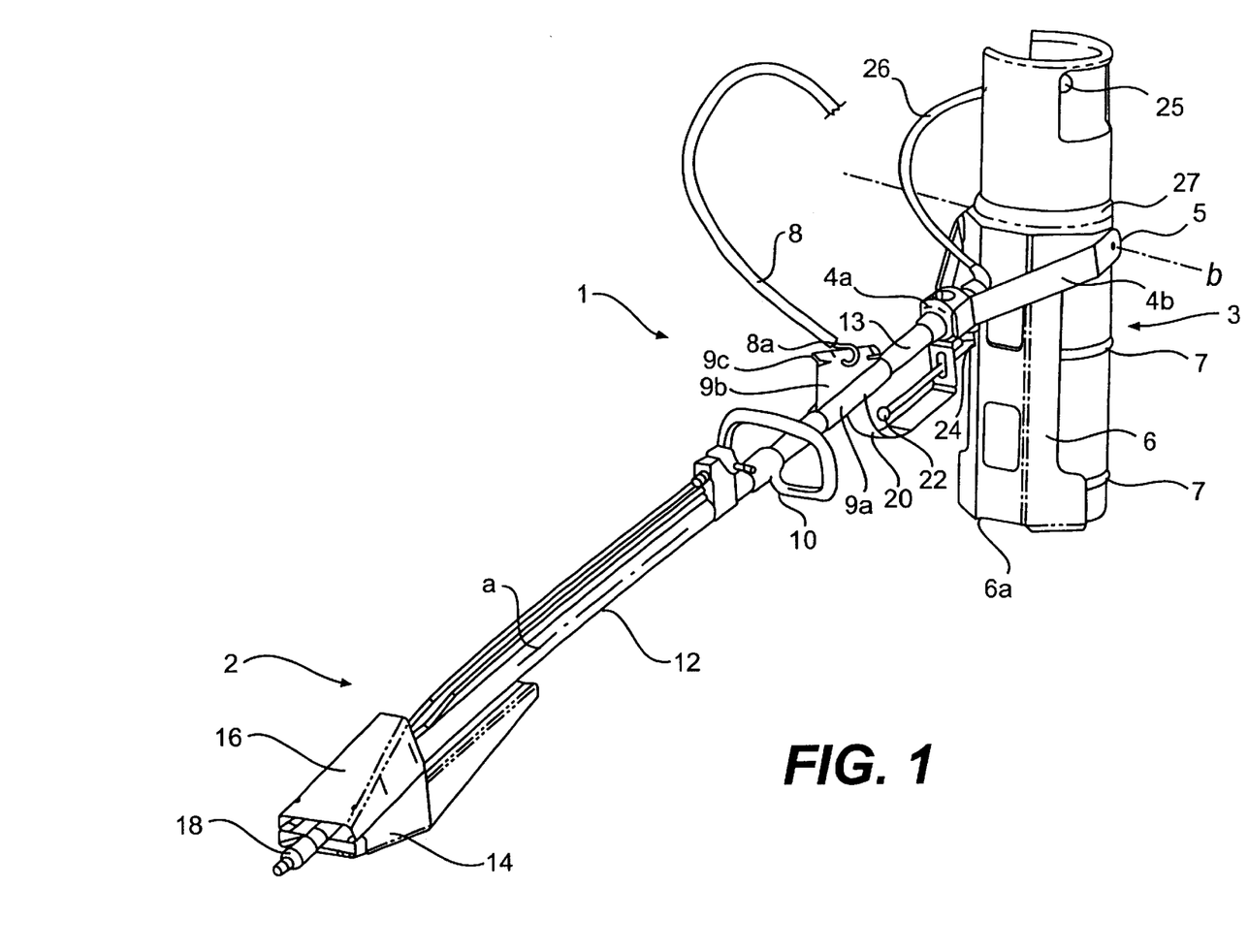
FIG. 1 is a perspective view of a hand-held flaming torch in accordance with one aspect of the present invention, showing a torch head, torch handle, torch operating elements, torch support strap and fuel tank mounting structure.
Figure 2:
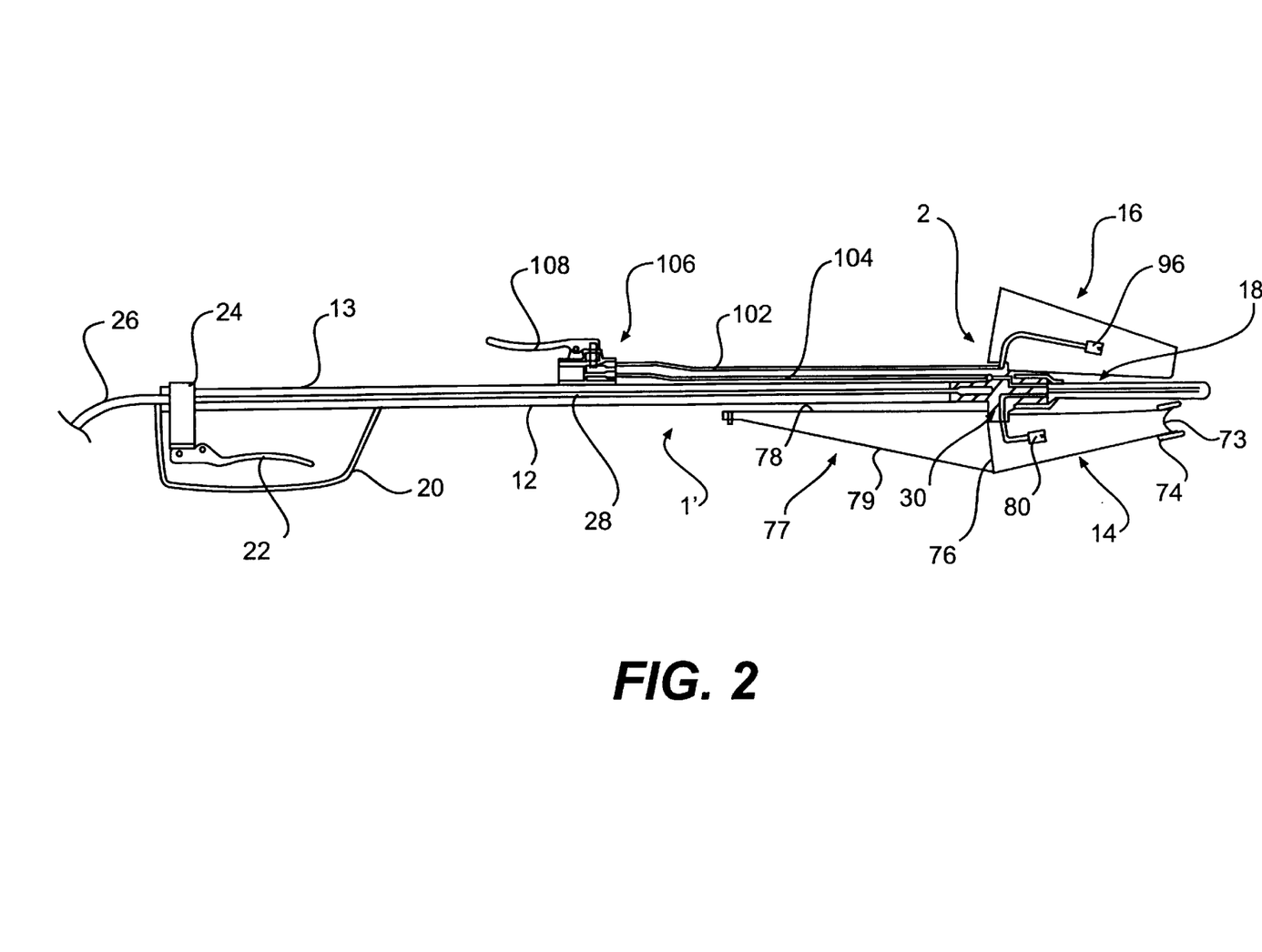
FIG. 2 is a schematic side view of another hand-held torch with a torch head having an integrated burner/vaporiser device in accordance with another aspect of the present invention.

Referring to the drawings, first to FIGS. 1 and 2, there is illustrated two variants of a hand-held, flaming torch 1 and 1' which use LPG as fuel source and which can be used in numerous applications, such as for flame cultivation of terrain that is inaccessible to larger, tractor-carried flame cultivator torch batteries, weeding of irrigation channels, burning of tree stumps, softening of bitumen surfaces for road works, spot back burning operations during forest fires and other applications which require localised application of a flame or high heat.

Torch 1 of FIG. 1 has two main structures, a torch head generally indicated at 2 and a fuel tank mounting structure, generally indicated at 3, whereas torch 1' of FIG. 2 lacks the fuel tank mounting structure, as the fuel supply cylinder for torch 1' is to be carried separately from the torch, either using a customised back pack or a non-motorised cart (not shown) as is known in the art.

A straight, aluminium or light weight metal or composite material support tube 12 supports at its lower end the torch head 2 which in the embodiments illustrated is composed of a primary burner 14, a booster burner 16 and a liquid LPG vaporiser 18. These components will be described in more detail below.

Handle or support tube 12 can be comprised of a number of individual tube sections for adjusting the length of torch 1, 1' for different applications. Handle 12 incorporates near its proximal end a first grip member 13 for one hand of the torch operator. A second handle grip in form of a loop handle 10 orientated at right angles to the longitudinal axis a of handle 12 is fixed thereon in spaced apart relationship from the first grip member 13, as seen in FIG. 1, but is not incorporated in FIG. 2.

Torches 1, 1' incorporate a trigger guard 20 disposed to cover the first grip member 13 as well as an actuator lever 22 which operates in known manner on a normally-closed deadman (shutter valve) 24 mounted on handle 12 and which serves to control LPG flow to the torch head 2 as is described below.

Fuel tank mounting structure 3 is supported at the proximal end of handle tube 12, the mounting structure being constructed such as to permit pivotal movement of an LPG storage cylinder 27 received therein about a rotational axis b that is perpendicular to the longitudinal axis a of handle tube 12.

Mounting structure 3 includes a shallow bed cradle 6 made of sheet metal or any other suitable, rigid material. It defines a bed shape which conforms with the exterior shape of LPG cylinder 27 and has bent terminal flange portions 6a for resting the cylinder foot thereon. A number of straps 7, which are secured to the cradle in any appropriate manner, serve to strap down and secure cylinder 27 on the cradle bed. The upper skirt of cradle 6 is provided with suitable fastening pins 5 so that it can be pivotally secured and held between a pair of angled support arms 4b which are welded onto the exterior of a socket hub 4a in which the proximal terminal end of tubular handle 12 is received and fixed against axial movement and preferably also against rotation, though the latter is not strictly necessary.

Mounting structure 3 is provided with any type of suitable low friction bearing elements fastening at pin 5 that permit weight induced, self tilting of the LPG tank 27 in relation to the torch handle 12 into its upright or vertical position when the torch head 2 is moved and pointed towards a treatment area.

A main liquid fuel supply line 26 in form of a metal braided, flexible LPG hose is secured in known manner with one of its fitted ends at the outlet valve 25 of the LPG cylinder and is connected with its other end in similar fashion to an elbow connector at the deadman shutter 24. Within handle tube 12 (see FIG. 2) extends a further fuel supply tube 28 that is suitably connected to shutter valve 24. LPG cylinder 27 provides the pressurised liquid fuel supply for torch head 2.

A strap harness 8 is secured on handle 12 at a location intermediate the first and second handle grips 10 and 13 such that, in use of the torch, the weight of LPG cylinder 27 serves to counterbalance the weight of torch head 2 when an operator shoulders the harness. A metallic bracket having a tubular portion 9a fixed against axial movement on the handle and having a tang 9b with a plurality of eye holes 9c in spaced apart relationship serves to secure the strap harness on the tubular handle 12. A connection shackle 8a of harness 8 can be selectively inserted and locked in one of eye holes 9c. By positioning the shackle 8a in different holes, it is possible to adjust the centre of balance of torch 1, when suspended from harness 8 shouldered by the torch operator. Accordingly, this simple mechanism allows to compensate manually a shift of the centre of balance of the torch which is consequential to fuel consumption by the torch, and thus due to weight reduction of the LPG cylinder during the course of operation of the flaming torch. An alternative mounting arrangement includes. a fixing bracket with indexed notches along a horizontal slot instead of discrete eye holes as illustrated.

To minimise the amount of effort that is required by the operator to point the torch head in the direction required whilst being shouldered, second handle grip 10 is mounted forward of harness strap fixing bracket 9 (that is towards torch head 2) but close thereto, and first handle grip 13 is located immediately rear of the balance point represented by the fixing point. To improve the safety of the torch operator, any suitable quick release device can be incorporated either in the shoulder harness strap or the harness fixing bracket at the torch handle thereby allowing the operator to free him or herself from the torch unit in case of an emergency.

Whilst not shown in the embodiment of FIG. 2, it is understood that torch 1' can also incorporate a harness 8 and harness attachment structure 9 and handle grip 10 as shown in FIG. 1.

Figure 3:
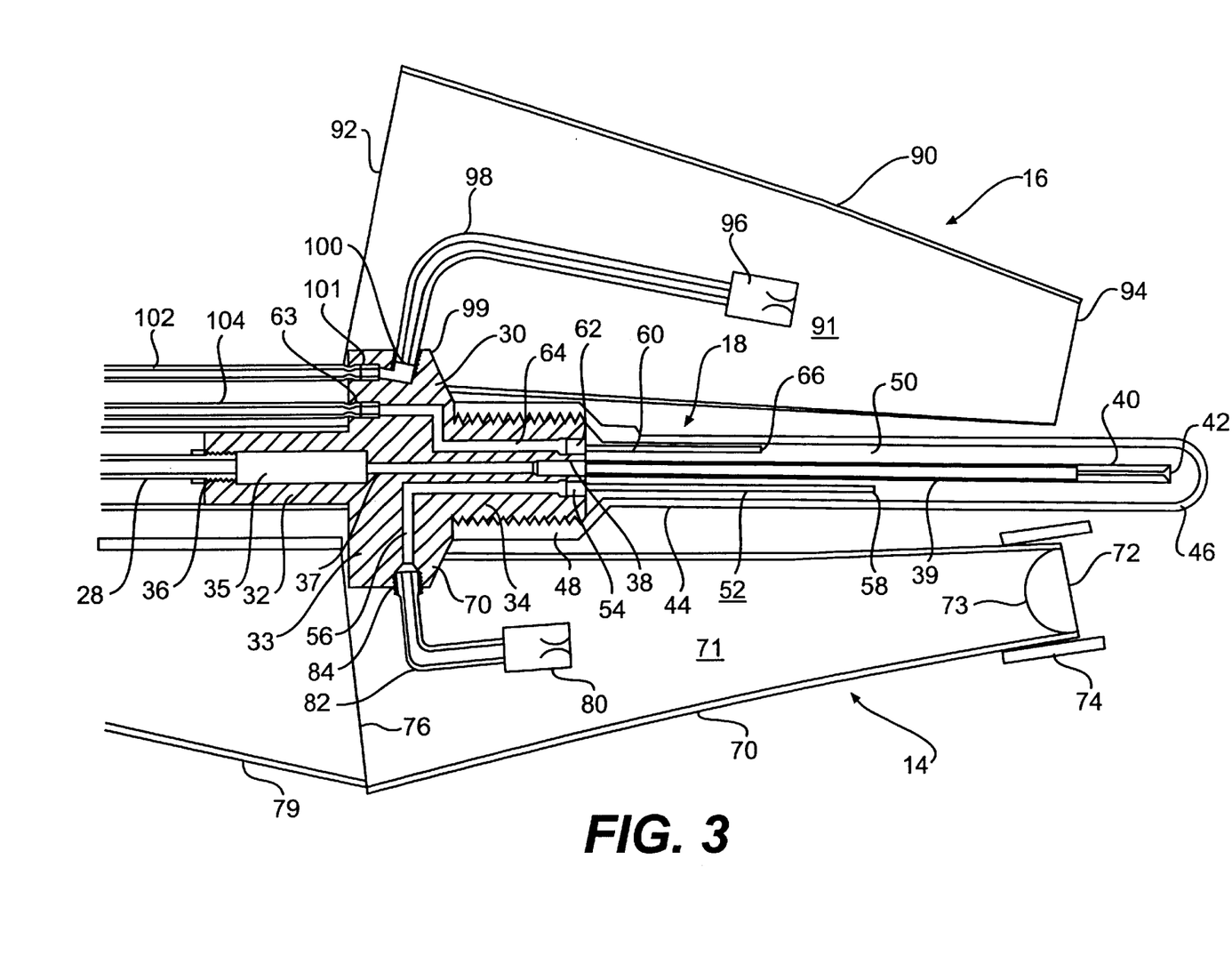
FIG. 3 is an enlarged, longitudinal section of the torch head illustrated in FIG. 2, showing the combined vaporiser/burner arrangement in greater detail.

Turning now to FIG. 3 which illustrates in greater detail the combined burner—vaporiser arrangement used in torch head 2 of torch 1 and 1'.

Vaporiser 18 includes a metallic main fitting 30 of unitary nature/construction, having a rear cylindrical mounting portion 32, a central, radially enlarged cylindrical mounting flange portion 33 and a forward, externally threaded, cylindrical hub portion 34. Support tube 12 is mounted and fixed on the rear mounting portion 32 by any appropriate mechanical fastening means, e.g. welding, clamping.

A central channel 35 extends between axially opposite end faces of main fitting 30. As can be seen in FIG. 3, central channel 35 comprises portions of varying diameter. Bore 35 ends at both sides in internally threaded bores 36, 38, bore 36 disposed to receive in known gas tight manner an appropriately threaded connection bush (not shown) secured at the forward, flared end portion of liquid fuel supply line 28. Bore 38 at the forward hub portion 34 receives a liquid fuel metering tube 39 as described herein below. It will be understood that the thread connections shown in FIG. 3 are illustrative only of different permanent/non-permanent ways of fastening the respective gas/liquid carrying elements to one another in pressure and leakage proof manner, different connection types being known to those of skill in the art.

Central bore or channel 35 which has an inner diameter of about 6 mm comprises a portion with reduced diameter. This portion serves as a first metering duct 37, the inner diameter being about 1 mm and having a length of about 40 mm in an actually manufactured device. The metering duct 37 is shaped to allow restriction of flow of liquid LPG passing through the central bore without any substantial pressure drop. Metering tube 39 extends forward of main fitting 30 to a length of about 250 mm and is mostly comprised of a tubular section with an inner diameter of about 4 mm, but also incorporates a reduced internal diameter portion (about 1 mm) of about 40 mm length at its forward end (indicated at 40) which terminates in a flash outlet orifice 42. Accordingly, the combined length of both flow restricting portions having the reduced diameter (1 mm) totals about 80 mm.

Vaporiser 18 further includes a tubular vaporiser housing 44 which has an enlarged diameter flared rear portion 48 that is internally threaded for securing the housing in gas tight manner onto the front hub portion 34 of fitting 30. The front portion 46 of housing 34 is shaped as a closed T-tip (not illustrated) in order to reduce the axial extension of housing 44 whilst providing increased volume within housing 44. As will be noted, a mostly annular vaporising chamber 50 is defined between the coaxially extending housing 44 and metering tube 39, with exception of the housing tip region 46 and the radially enlarged coupling zone between housing 44 and main fitting 30. A first gaseous fuel pressure reduction tube 52 is incorporated into vaporiser 18 and located within pressurisation chamber 50. Tube 52 is secured in any suitable manner at hub portion 34 of main fitting 30 (e.g. by way of a leakage-proof threaded connection illustrated at 54) so as to be in communication with a first gas delivery channel 56 formed within the fitting body and extending in the hub and central portions 34 and 33. First pressure reduction tube 52 has a length and inner diameter such that gaseous fuel entering tube 52 from vaporisation chamber 50 at tube inlet 58 will undergo a defined pressure drop before reaching channel 56, as will be explained in more detail below. In an actually manufactured embodiment, tube 52 has a length, of about 150 mm with a bore of 0.8 to 0.9 mm, whilst the diameter of channel 56 is 4 or 6 mm.

Also incorporated in vaporiser 18 is a second gaseous fuel pressure reduction tube 60 secured in gas-tight manner in a threaded bore 62 in the front end of hub portion 34 of fitting 30 so as to be in fluid communication with a second gas passage duct 64 which ends in a rearward facing surface of central portion 33 of fitting 30 in yet another threaded bore 63. The length between the inlet orifice 66 of second pressure reduction tube 60 and threaded bore 62 in an actually manufactured torch is about 40 mm, whilst the inner diameter is about 1 mm. Accordingly, due to its different dimensions as compared to first pressure reduction tube 52, a different pressure reduction ratio is provided by the second pressure reduction tube 60 for gas entering from pressurisation chamber 50.

Turning now to primary burner 14, it will be seen that it comprises a burner skirt or housing 70 of sheet metal which is open at its rear and front end. The cross-sectional shape can be quadrilateral or cylindrical, and is tapered from the rear to the front. In case of a cylindrical skirt, the front portion is ovoid and reduced in diameter. The front end opening 72 is covered by a heat/flame resistant gauze or mesh insert 73 which is bent concavely into the interior of skirt 70 which defines a burner chamber 71. Heat shield plates 74 can be fastened surrounding the front end opening 72, shield 74 serving as a deflector for flames existing the front end opening 72. In rearward extension of the rear opening 76, which provides an ingress passage for combustion air for the burner, is arranged a tapered-shaped cover 77 which incorporates a rigid gauze or mesh member 78 (see FIG. 2) facing handle or support tube 12 and a sheet-metal shield member 79. Rigid gauze or mesh member 78 prevents ingress of unwanted objects into the burner chamber 71 as the burner is moved close to ground, whilst ensuring proper air supply to burner 14. Cover 77 is fastened at skirt 70 in any appropriate manner, skirt 70 itself being soldered or screwed onto the central flange 33 of main fitting 30, as appropriate.

Primary burner 14 also includes at least one, but preferably three fuel delivery or burner jet nozzles, one of which is shown schematically at 80. Each nozzle has an appropriately dimensioned jet orifice outlet (e.g. 0.8 or 0.6 mm) disposed to direct a jet stream of gaseous fuel towards the front end opening 72 of burner skirt 70. Jet nozzles 80 are held in place within burner chamber 71 near its rearward end by means of a bent gas supply tube 82 which is itself fastened at the flange portion 33 of main fitting 30 (at threaded, sealed connection 84) so as to be in fluid communication with gas passage duct 56 and thereby receive fuel from the vaporisation chamber 50 via pressure reduction tube 52. It should be noted here that the inner diameter of gas delivery channel 56 is chosen such as to avoid a further, notable pressure drop beyond that which is provided by pressure reduction tube 52. Whilst it would also be possible to entirely omit pressure reduction tube 52 and instead provide gas passage duct 56 to have similar dimensions to those of tube 52 to thereby provide a pressure reduction duct that is integrally formed within main fitting 30, manufacturing considerations make the presently illustrated design preferable. Furthermore, providing the necessary gas pressure reduction conduit/duct in a separate element which is removably fastened to main fitting 30 allows installation and exchanging of pressure reduction tubes that have different dimensions so as to adapt the torch to different fuel types and to achieve different operating gas pressures at the burner nozzles.

Booster burner 16 which is arranged on the opposite side of vaporiser 18 has a similar overall layout to that of primary burner 14 and comprises a burner hood or skirt 90 open at its rear end 92 for admitting combustion air (a gauze or cage cover like the one of primary burner 14 being optional) and having a discharge opening/mouth 94 arranged to direct flames emanating therefrom obliquely onto the flames exiting from primary burner 14. It will be noted that only a short portion of vaporiser housing 44, namely the front T-shaped tip 46 extends beyond the plane containing both burner openings/mouths 72 and 94. Accordingly, only the terminal end of vaporiser housing 44 will be exposed to direct heat in operation of the torch, the burners providing the required vaporising energy (heat) for the liquid LPG fuel supplied to the vaporiser, as was explained above.

It will also be noted that the booster jet nozzle 96 (not necessarily only one provided) is located more in the central zone of burner chamber 91 within burner hood 90, but is similarly supported in place by way of a rigid, bent fuel supply tube 98 whose terminal end is sealingly secured within threaded bore 99 of a gas channel 100 extending in central flange portion 33 of main fitting 30. Channel 100 terminates in a rearward facing side of portion 33 in another internally threaded bore 101. A stainless steel fuel supply tube 102 is appropriately secured at bore 101 and extends towards the middle section of torch rod 12 as can be seen in FIG. 2, where it is coupled to the outlet of a shutter valve 106 secured on handle rod 12. Shutter valve 106 incorporates in known manner a biased valve body arranged to open and close gas access to fuel supply tube 102 from a valve inlet, the valve body being operated by a cantilever handle 108 in known manner. The gas inlet of shutter valve 106 is in fluid communication via a further copper fuel supply tube 104 with the threaded bore 63 of gas supply channel 64 extending within main fitting 30. Accordingly, fluid communication can be established from vaporising chamber 50 via second gas reduction tube 60, gas passage or channel 64 and supply tube 104 to shutter valve 24, which controls flow of gas, and then via supply tube 102, gas passage 100 and supply tube 98 to the burner nozzles 96 of booster burner 16.

As will be noted from the above description, torches 1, 1' incorporate only one valve with moveable parts, namely shutter valve 106 in the gaseous fuel supply path from vaporiser chamber 50 to booster burner 16, the valve to cut/permit liquid fuel flow from the LPG storage cylinder into flexible hose 26 (liquid fuel supply line) of the torch being mounted/forming part of the LPG cylinder. However, non of these valves serve as conventional regulators to adjust pressure or flow rate of the fuel, either in liquid or in gaseous form. Of course, shutter valve 106 in the gas supply path of the booster burner could be exchanged for a conventional pressure regulating valve. It is believed, however, that gas pressure regulation of the gaseous fuel delivered to the booster burner 16 during expected operational parameters and application of the hand-held torch will be superfluous. However, such arrangement may be desirable in other torch embodiments, i.e. in burner batteries used in multiburner flame cultivators, as the combined burner/vaporiser arrangement of the present invention can similarly be incorporated in torch heads (or burner devices) used in such flame cultivators.

The fuel source for the torch is conventional LPG gas in liquid form. The size of conventional LPG gas cylinders that can be carried by a torch operator on his back or on a wheeled trolley is limited by weight considerations and manoeuvrability in rough terrain. Similarly, the amount of LPG fuel available for flaming operations will be restricted to that which can be safely stored in standard size cylinders under pressure at expected ambient temperatures during operation of the torch. Accordingly, it is expected that hand-held torch embodiments in accordance with the present invention will be operated with gas cylinders with a capacity of between 1.5 US Gal (5.7l) and 5 US Gal (19l) under full tank pressures (e.g. liquid propane) of between about 90 to about 130 PSI gas pressure (6,200 hPa gas pressure to 8,960 hPa gas pressure). In a typical application, a 5 kg gas fuel capacity cylinder full of LPG will have a cylinder outlet pressure of between 90 and 130 PSIg (6,200 hPa to 8,960 hPa gas pressure) depending on the exterior ambient temperature.

This pressure will be substantially maintained in the tank for as long as there is liquid LPG in the tank and will only drop over a short period of time prior to the tank reaching empty. In the following, an average tank pressure of 100 PSIg=6900 hPa gas=7900 hPa absolute pressure will be assumed to be present at the storage tank outlet valve. All further pressures mentioned will be absolute pressures unless where stated otherwise. Assuming a pressure drop of 300 hPa in the fuel supply line leading from the tank/cylinder to the vaporiser main fitting 30, liquid LPG will be delivered with 7600 hPa pressure at the entrance of the metering duct 37 of vaporiser 18. A further pressure loss of about 200–300 hPa will take place in the metering ducts at 37 and 40 prior to liquid LPG exiting into the vaporisation chamber 50 through flash outlet orifice 42. With the geometrical values given above for pressure reduction tubes 52, 60, nozzles 80, 96 and metering duct portions 37, 40, vaporisation chamber pressure will be in the vicinity of 7400 hPa during normal, steady state burner operation where incoming liquid fuel is fully vaporised into its gaseous state (the fuel experiencing hereby a volume increase of about 280 fold), thereby generating sufficient "back" pressure in chamber 50. The required vaporisation heat is provided by the primary burner to the tip portion 46 of vaporiser housing 44. It has been found during operation of a torch with vaporiser and burners as arranged in FIG. 3, that vaporise housing 44, will remain relatively cool (due to the uptake of energy of liquid LPG during vaporisation), the temperature of flashing of LPG at the outlet orifice 42 being around 20–30° C. Gaseous LPG in other zones of the vaporising chamber 50 will have temperatures ranging between 80° C. to about 100° C. at a pressure of about 7400 hPa. The first pressure reduction tube 52 will reduce the pressure of gaseous LPG delivered to the primary burner nozzles 80 to about 2900 hPa (equivalent to about 25 PSI gas) with burner flame temperature near the transition zone gas to flame of about 600° C. Similarly, the second pressure reduction tube 60 associated with the booster burner 16 will cause a pressure drop of gaseous LPG supplied through the second tube 60 via shutter valve 106 to booster nozzle 90 so that. operating pressure at the booster nozzle will be about 4000 hPa (about 40 PSI gas), the gas—flame transition temperature being about 670° C. Burner gas flow measured showed about 42% delivery rate to the primary burner and 58% to the booster burner whilst the latter was engaged. The above values are approximations only and are valid for torch operation where the booster and primary burners are in use after the vaporiser has reached normal operating temperatures at which the full amount of incoming, liquid LPG is vaporised in the vaporising chamber 50. Different values will apply during torch operations in which the booster burner shutter valve 106 cuts gaseous fuel supply to the booster burner nozzles 90. However, the operating pressure of the primary burner nozzles will still remain in the vicinity of 2900 hPa such that a low velocity, wide spreading flame is generated in the primary burner 14, widening of the flame being aided by the gauze mesh 73 covering the burner outlet 72. On the other hand, the comparatively high operating pressure present at the booster burner nozzles during booster operation of the torch will provide an additional high velocity, and further spreading flame which, due to the oblique arrangement of the flame spreading planes of the primary and booster burners, will enhance flame penetration. The temperature of the actual flame of the primary burner will be about 1080° C. whereas the high velocity booster burner flame will reach temperatures of around 1200° C.

Torch 1, 1' can be ignited by allowing liquid LPG to flow into the vaporiser 18 from where it will exit (in liquid form) through the primary burner nozzles 80 where it is subsequently ignited using a conventional lighter, as is the case with the torch of Pivonka described above. On the other hand, during a short period of time of about 5 to 10 seconds after opening the main valve at the LPG cylinder, liquid LPG entering the vaporiser chamber will vaporise partially (as it can "pick-up" sufficient heat from its surroundings without additional heat transfer into the vaporiser), this partially vaporised fuel mixture being able to be ignited more readily upon exiting the burner nozzles than liquid LPG.

Once steady state (normal operation) has been reached, and the vaporiser produces gaseous fuel to supply both burners 14, 16, booster burner 16 can be fired selectively by means of the handle operated shutter valve 106.

It should be noted that the flow restriction of liquid fuel into the vaporising chamber 50 by way of metering duct 37 and metering tube 39 is such that the fuel amount delivered is about equal to the vaporisation rate achievable during normal torch operating conditions. As alluded to above, because the two pressure reduction tubes 52 and 60 as well as the metering tube 39 (which provides part of the overall length of the metering flow restricting metering duct) are mounted in removable fashion within the vaporisation chamber 50 (the vaporiser housing being readily unscrewed from the main fitting), it is possible to exchange these components to suit the specific type of fuel employed with the torch in order to obtain a desired burner nozzle operating pressure.

It will be appreciated by those engaged in the field of flame cultivation that the torch head 2 illustrated and described with reference to FIG. 3 can be modified in simple manner for replacing conventional burner arrangements used in large scale agricultural flame cultivators such as those described in Holloway, Pardee, and Pivonka, supra.

What is claimed is:

1. A burner device for flame cultivation and flaming purposes, comprising:
   a primary burner having at least one fuel delivery jet nozzle arranged in an open combustion chamber defined within a burner skirt to direct a stream of fuel towards a flame delivery opening of the skirt;
   a vaporiser located in heat exchanging proximity to the primary burner and having a pressurisation chamber with an inlet for liquid fuel and an outlet for vaporised, gaseous fuel, the inlet being arranged to receive fuel in liquid state from a source of pressurised liquid fuel and the outlet being in fluid communication with the nozzle of the primary burner;
   a metering duct located in close vicinity to or within the vaporiser and arranged to discretely limit the amount of liquid fuel entering the vaporisation chamber via its inlet; and
   a first pressure reduction duct provided in the flow path of gaseous fuel between the vaporisation chamber outlet and the nozzle of the primary burner; the first pressure reduction duct arranged to impart a discrete pressure drop to gaseous fuel flowing therethrough from the vaporisation chamber to the nozzle of the primary burner, the discrete pressure drop being used to generate a low velocity combustion flame in the primary burner during normal torch operation.

2. The burner device in accordance with claim 1, further comprising:
   a booster burner having at least one booster jet nozzle which is in fluid communication with the vaporisation chamber through a second pressure reduction duct which is arranged to reduce the pressure of gaseous fuel exiting the vaporisation chamber by a predetermined amount required to generate a medium to high velocity combustion flame in the booster burner during normal torch operation.

3. The burner device according to claim 2, wherein the at least one nozzle of the booster burner is disposed in an additional burner skirt defining a booster combustion chamber, the primary and booster burner skirts being arranged such that flames emitting through the flame delivery openings intersect at a small angle such that a wide spreading, low velocity combustion flame of the primary burner is superimposed with a narrower, high velocity combustion flame of the booster burner.

4. The burner device in accordance with claim 2 or 3, further comprising:
   a manually operatable shutter valve to selectively permit and cut-off gaseous fuel flow to the booster burner.

5. A flame cultivation and flaming torch head with integral fuel vaporiser for use with LPG fuel, comprising:
   a fuel delivery member having a liquid fuel inlet that is connectable to a pressurised source of liquid LPG fuel, a fuel outlet and a metering duct of predetermined length and cross-sectional area extending between the inlet and the outlet for limiting the volume of liquid fuel flow from said source of LPG fuel past the fuel outlet;
   a vaporiser housing defining a vaporisation chamber, the fuel delivery member outlet arranged to discharge fuel into the vaporising chamber, the metering duct being arranged in heat conducting communication with the vaporising chamber;
   a heater arranged to heat the vaporiser housing to an extent necessary to achieve full vaporisation of liquid LPG fuel entering the vaporising chamber;
   a first pressure reduction duct of predetermined length and cross-sectional area having a gaseous fuel inlet in communication with the vaporisation chamber and a gaseous fuel outlet, the pressure reduction duct arranged to cause a drop in pressure of gaseous fuel entering from the vaporisation chamber passing therethrough and exiting via the gaseous fuel outlet;
   at least one primary burner jet nozzle in fluid communication with the gaseous fuel outlet of the first pressure reduction duct and arranged to deliver through at least one orifice a low pressure gaseous fuel stream for the formation, in use of the torch, of a low velocity torch flame;
   a hollow burner skirt that houses the jet nozzle having an orifice arranged to direct the gaseous fuel stream into the interior of the skirt towards an opening mouth at a front end of the skirt; and
   means for ventilating the interior of the burner skirt and supplying combustion air for the burner jet nozzle.

6. The torch head according to claim 5, wherein the metering duct comprises:
   a first duct portion having a predetermined first length and a second duct portion having a predetermined second length, the second duct portion being formed by a separate part removably attached to a main body part of the fluid delivery member.

7. The torch head according to claim 6, wherein the fuel outlet of the fluid delivery member is an orifice incorporated in the separate part.

8. The torch head according to claim 5, 6, or 7 wherein the first pressure reduction duct is provided by a tube extending into the vaporisation chamber and removably fixed at the main body part of the fuel delivery member in fluid communication with a gas supply channel leading to the primary burner jet nozzle.

9. The torch head according to claim 5, 6 or 7 wherein the first pressure reduction duct forms part of a gas supply channel integrally formed within the main body part of the fuel delivery member.

10. The torch head according to claim 6, wherein the main part of the fuel delivery member is a unitary metallic fitting having an externally threaded front hub portion onto which is sealingly fastened in removable manner the otherwise closed tubular vaporiser housing.

11. The torch head according to claim 5, wherein the vaporiser housing includes a T-shaped terminal closed end.

12. The torch head according to claim 10, wherein the fitting incorporates a fluid fuel passage channel which extends between internally threaded connection bores located one in the hub portion and one in a rear mounting portion of the fitting, the fluid fuel passage channel incorporating one of the metering duct and the first portion thereof.

13. The torch head according to claim 12, wherein the rear mounting portion is cylindrical and externally threaded to receive and secure a hollow rod which provides a support handle of the torch.

14. The torch head according to claim 13, wherein a fuel supply line extends within the hollow rod and is fastened in leakage and pressure proof manner at the threaded connection bore at the rear mounting portion of the fitting.

15. The torch head according to claim 14, wherein the fitting further incorporates at least one gas passage channel that terminates in threaded connection bores which respectively receive and secure the first pressure reduction tube and a rigid gas supply tube or line which supports at its free end the burner jet nozzle, the arrangement being such that the first pressure reduction tube extends within the vaporisation chamber in its entirety and the threaded bore supporting the gas supply tube is located outside the vaporisation chamber.

16. The torch head according to claim 5, wherein a primary burner skirt is one of quadrilateral, duct-like shape with front and rear openings, and of tubular shape with a rear circular tubular portion and a diameter reduced, ovoid tubular front portion, the at least one primary burner jet nozzle being located within a burner chamber provided by the skirt by means of a rigid gas supply tube which supports the at least one jet nozzle at the fitting.

17. The torch head according to claim 16, wherein a flame outlet opening of the burner skirt is covered with a heat and flame resistant gauze that bends concave into the burner chamber to enhance formation of a low spreading flame during torch operation.

18. The torch head according to claim 10 or 16, wherein the fuel delivery fitting comprises a radially extending, central mounting flange portion to which the burner skirt is secured.

19. The torch head according to claim 5, further comprising:
  a second pressure reduction duct of a predetermined length and cross-sectional area having a gaseous fuel inlet in communication with the vaporisation chamber and a gaseous fuel outlet, the second pressure reduction duct arranged to cause a drop in pressure of gaseous fuel entering from the vaporisation chamber, passing there through and exiting via its gaseous fuel outlet which is less than that caused in the first pressure reduction duct;
  at least one booster burner jet nozzle in fluid communication with the gaseous fuel outlet of the second pressure reduction duct and arranged to deliver through at least one orifice a medium to high pressure gaseous fuel stream for the formation, in use of the torch, of a medium to high velocity torch flame; and
  a hollow burner skirt that houses the booster burner jet nozzle with its orifice arranged to direct the gaseous fuel stream into the interior of he skirt towards an opening mouth at a front end of the skirt such that the booster burner flame is superimposed to the primary burner flame.

20. The torch head according to claim 19, further comprising:
  regulator valve disposed between the gaseous fuel outlet of the second pressure reduction duct and the at least one booster burner jet nozzle so as to selectively cut and enable fuel supply to the at least one booster burner jet nozzle.

21. The torch head according to claim 19, wherein the burner skirt surrounding the at least one booster burner nozzle is different to that in which the at least one primary burner nozzle is located, the arrangement of the skirts with respect to one another being such that the planes in which the fuel streams are delivered by the respective jet orifices of the nozzles intersect at an oblique or acute angle, such that the medium to high velocity flame impinges on the low velocity flame and drags this flame with it, thereby creating a flame pattern that is wider than a pure high velocity flame and more energetic than the wide spreading flame of the primary burner alone.

22. The torch head according to claim 19, wherein a heating energy for heating the vaporiser housing is supplied by at least the primary burner once the torch been ignited.

23. The torch head according to claim 5, wherein the vaporiser housing and the skirt of at least the primary burner are arranged such that flames exiting the mouth of the burner skirt will radiate heat energy substantially only to a tip of the vaporiser housing so as to avoid overheating of the vaporisation chamber and its contents.

24. A hand held flaming torch, comprising:
  an elongate handle, a torch head at one end of the handle, and a fuel tank mounting structure at an opposite end of the torch handle, wherein the fuel tank mounting structure includes a handle mount fixed at the handle and a tank support structure pivoted at the handle mount, whereby in use of the torch the weight of the torch head is at least partly counterbalance with the weight of a fuel storage tank secured at the tank support structure and the tank is pivotable with respect to the handle so as to remain in a substantially upright position during operation of the torch.

25. A hand-held flaming and flame cultivation torch, comprising:
  an elongate torch handle having a longitudinal axis;
  a first handle grip at or near a proximal end of the handle;
  a second handle grip on the handle located spaced apart from the first handle grip;
  a torch head supported at or near a distal end of the handle, the torch head having at least one burner arranged for generating a flame;
  a fuel supply lien arranged to deliver fuel to the burner, the fuel supply line being connectable to a fuel storage tank;
  a fuel storage tank mounting structure at the proximal end of the handle, the mounting structure arranges so as to enable pivotal movement of the storage tank when received therein about a pivot axis that is perpendicular to the longitudinal axis of the handle; and
  a strap harness secured on the handle at a location forward of the first handle and intermediate the first and second handle grips where the second hand grip is provided, such that, in use of the torch, the weight of the fuel storage tank serves to counterbalance the weight of the torch head when an operator shoulders the harness.

26. The hand held flaming torch according to claim 25, wherein the mounting structure comprises:
  a shallow bed cradle having a bed shape conforming with an exterior shape of a cylinder and at least one terminal flange portion for resting a foot of the cylinder thereon.

27. The hand held flaming torch according to claim 26, wherein the mounting structure further comprises:
  a plurality of straps which are secured to the cradle, serve to strap down and secure the cylinder on the cradle bed.

28. The hand held flaming torch according to claim 27, wherein the mounting structure further comprises:
  a gimbal mounting which an upper skirt of the cradle is pivotally secured and held between a pair of angled support arms which are secured on a socket hub in which the proximal terminal end of the torch handle is received and fixed against at least one of axial movement and rotation.

29. The hand held flaming torch according to claim 25, further comprising:
  a fixing device for the harness mounted at he handle, the fixing device arranged to allow shifting the location at which the harness is secured at the handle to compensate for a shift of center of balance of the torch as a result of fuel consumption during operation fo the torch.

30. The hand held flaming torch according to claim 29, wherein the fixing device is a bracket having a tubular portion fixed against axial movement on the handle and having a tang with a plurality of eye holes in spaced apart relationship which are disposed to selectively receive a connection shackle of the harness strap.

31. The hand held flaming torch according to claim 29, wherein the fixing device is a bracket having a tubular portion fixed against axial movement on the handle and having a tang with indexed notches along a horizontal slot, the notches being disposed to selectively receive a connection shackle of the harness strap.

32. The hand held flaming torch according to claim 25, wherein the second handle grip is mounted forward of the strap harness fixing point but close thereto and includes a loop handle portion orientated at right angles to the torch handle, and wherein the first handle grip includes a tubular grip member located immediately rear of a balance point represented by said fixing point.

33. The hand held flaming torch according to claim 29, further comprising:

a quick release device incorporated in one of the strap harness and the harness fixing device at he torch handle thereby to allow an operator to free him or herself from the torch unit in case of an emergency.

\* \* \* \* \*

UNITED STATES PATENT AND TRADEMARK OFFICE
CERTIFICATE OF CORRECTION

PATENT NO.   : 6,257,875 B1
DATED        : July 10, 2001
INVENTOR(S)  : Ian Johnstone et al.

It is certified that error appears in the above-identified patent and that said Letters Patent is hereby corrected as shown below:

Item [57], ABSTRACT,
Line 13, "the other being" should read -- the outlet being --
Line 13, insert -- fluid -- before "communication"

Column 19, claim 19,
Line 40, "he" should read -- the --

Column 20, claim 25,
Line 25, "lien" should read -- line --

Column 20, claim 29,
Line 60, "he" should read -- the --
Line 64, "fo" should read -- of --

Column 22, cliam 33,
Line 9, "he" should read -- the --

Signed and Sealed this

Twenty-fifth Day of December, 2001

Attest:

*Attesting Officer*

JAMES E. ROGAN
*Director of the United States Patent and Trademark Office*